United States Patent
Song

(10) Patent No.: US 11,087,755 B2
(45) Date of Patent: Aug. 10, 2021

(54) ELECTRONIC DEVICE FOR VOICE RECOGNITION, AND CONTROL METHOD THEREFOR

(71) Applicant: SAMSUNG ELECTRONICS CO., LTD., Suwon-si (KR)

(72) Inventor: Myung-suk Song, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 125 days.

(21) Appl. No.: 16/327,646

(22) PCT Filed: Jun. 28, 2017

(86) PCT No.: PCT/KR2017/006800
§ 371 (c)(1),
(2) Date: Feb. 22, 2019

(87) PCT Pub. No.: WO2018/038379
PCT Pub. Date: Mar. 1, 2018

(65) Prior Publication Data
US 2019/0221210 A1  Jul. 18, 2019

(30) Foreign Application Priority Data
Aug. 26, 2016 (KR) .......... 10-2016-0109481

(51) Int. Cl.
*G10L 15/22* (2006.01)
*G10L 15/20* (2006.01)
(Continued)

(52) U.S. Cl.
CPC .............. *G10L 15/22* (2013.01); *G06F 3/167* (2013.01); *G10L 15/20* (2013.01); *G10L 21/02* (2013.01);
(Continued)

(58) Field of Classification Search
CPC ................................ G10L 15/22; G10L 15/30
See application file for complete search history.

(56) References Cited

U.S. PATENT DOCUMENTS

| 6,397,186 B1 * | 5/2002 | Bush ....................... G06F 3/167 |
| | | 704/274 |
| 7,680,287 B2 | 3/2010 | Amada et al. |

(Continued)

FOREIGN PATENT DOCUMENTS

| JP | 2002-91469 A | 3/2002 |
| JP | 2004-109361 A | 4/2004 |

(Continued)

OTHER PUBLICATIONS

Communication dated Jul. 5, 2019, issued by the European Patent Office in counterpart European Application No. 17843799.2.

(Continued)

*Primary Examiner* — Daniel Abebe
(74) *Attorney, Agent, or Firm* — Sughrue Mion, PLLC

(57) ABSTRACT

An electronic device and a control method therefor are provided. The electronic device comprises: a plurality of microphones for receiving audio signals in which voice signals are included; a communicator for receiving state information according to information about a connection with the electronic device; and a processor for determining the noise environment around the electronic device based on one or more of audio amplitude information that is received by the plurality of microphones and that is output by an external device, and state information of the external device, and for processing the voice signal based on the determined noise environment so as to perform voice recognition.

12 Claims, 12 Drawing Sheets

(51) Int. Cl.
*G10L 21/02* (2013.01)
*G10L 25/87* (2013.01)
*G06F 3/16* (2006.01)

(52) U.S. Cl.
CPC ........ *G10L 25/87* (2013.01); *G10L 2015/223* (2013.01)

(56) References Cited

U.S. PATENT DOCUMENTS

| | | | |
|---|---|---|---|
| 8,976,978 B2 | 3/2015 | Kitazawa et al. | |
| 9,275,625 B2 | 3/2016 | Kim et al. | |
| 9,521,484 B2 | 12/2016 | Kim | |
| 2003/0093281 A1* | 5/2003 | Geilhufe | G10L 13/00 704/275 |
| 2004/0066941 A1 | 4/2004 | Amada et al. | |
| 2005/0267759 A1* | 12/2005 | Jeschke | B60R 16/0373 704/270 |
| 2006/0182291 A1* | 8/2006 | Kunieda | G10L 15/22 381/110 |
| 2011/0293107 A1 | 12/2011 | Kitazawa et al. | |
| 2013/0216064 A1 | 8/2013 | Kim | |
| 2014/0241549 A1 | 8/2014 | Stachurski et al. | |
| 2014/0244259 A1* | 8/2014 | Rosario | G10L 15/19 704/254 |
| 2014/0254816 A1 | 9/2014 | Kim et al. | |
| 2014/0324421 A1 | 10/2014 | Kim et al. | |
| 2015/0279356 A1* | 10/2015 | Lee | G10L 15/20 704/251 |

FOREIGN PATENT DOCUMENTS

| | | |
|---|---|---|
| JP | 2007-65122 A | 3/2007 |
| JP | 2008-64892 A | 3/2008 |
| JP | 2010-197727 A | 9/2010 |
| KR | 10-0303477 B1 | 9/2001 |
| KR | 10-2004-0073145 A | 8/2004 |
| KR | 10-2011-0132245 A | 12/2011 |
| KR | 10-2015-0123902 A | 11/2015 |
| WO | 2012/057589 A2 | 5/2012 |

OTHER PUBLICATIONS

International Search Report dated Oct. 16, 2017 by the International Searching Authority in International Patent Application No. PCT/KR2017/006800. (PCT/ISA/210).

Written Opinion dated Oct. 16, 2017 by the International Searching Authority in International Patent Application No. PCT/KR2017/006800. (PCT/ISA/237).

* cited by examiner

ELECTRONIC DEVICE FOR VOICE RECOGNITION, AND CONTROL METHOD THEREFOR

BACKGROUND

Field

The disclosure relates to an electronic device for voice recognition including a plurality of microphones and a method for controlling thereof and, more particularly, to an electronic device which provides improvement for voice recognition performance of an electronic device that remotely controls a content reproducing device communicating with the electronic device and a method for controlling thereof.

Description of Related Art

With the recent increase in use of internet of things (IoT), the use of voice recognition technology is widely used for operation of a user terminal.

For example, a microphone array including a plurality of microphones and an electronic device equipped with a voice recognition function may remotely control content reproducing devices (for example, a television, a disc player, a media file player, a smart phone, etc.) that include separate video and/or audio contents through voice recognition of a user.

A method for preprocessing a voice signal of the electronic device includes separating a sound source from a voice signal which is input to the plurality of microphones, removing noise, and extracting a voice signal in a designated direction.

In general, a microphone array of a plurality of microphones can sense a sound source direction or position and provide beamforming for noise reduction and/or echo-position.

The beamformer providing beamforming generates an audio signal which is strengthened with respect to a target direction.

In the voice recognition technology which uses a microphone array composed of a plurality of microphones, the electronic device determines all the directions in which an audio signal can be input as target directions with the same ratio.

When an electronic device equipped with a voice recognition function controls content reproduction apparatuses, the output sound of the content reproduction apparatuses has a higher energy level and strong direction than general background noise. Therefore, in the electronic device, the user's voice in the target direction can be removed by the sound output from the content reproduction apparatus, and the voice distortion can be generated. Thereby, the electronic device has a problem that the voice recognition performance desired by the user is deteriorated.

Therefore, there is a need for a voice recognition preprocessing method capable of improving voice recognition performance of an electronic device based on state information of a content reproduction apparatus controlled by an electronic device.

SUMMARY

It is an object of the disclosure to provide an electronic device which includes a plurality of microphones which remotely control an external device that is a content reproducing device and a voice recognition function. Based on state information of an external device, the electronic device improves decline in voice recognition by an electronic device in a noise environment of an external device and a controlling method thereof.

An electronic device which receives audio signals in which voice signals are included, according to an embodiment of the disclosure includes a plurality of microphones for receiving audio signals in which voice signals are included; a communicator for receiving state information according to information about a connection with the electronic device; and a processor for determining the noise environment around the electronic device based on one or more of audio amplitude information that is received by the plurality of microphones and that is output by an external device, and state information of the external device, and for processing the voice signal based on the determined noise environment so as to perform voice recognition.

According to an embodiment, a method for processing a voice signal by an electronic device includes receiving audio signals in which voice signals are included through a plurality of microphones; receiving state information according to information about a connection with an external device; determining a noise environment around the electronic device based on one or more of audio amplitude information that is received in the receiving step and that is output by the external device, and state information of the external device; processing the voice signal based on the determined noise environment; and performing voice recognition based on the processed voice signal.

Effect of Invention

Based on the aforementioned embodiments, the electronic device and a controlling method thereof are capable of improving decline in voice recognition due to ambient noise by determining a noise environment around the electronic device based on state information of the external device that communicates with the electronic device and reproduces contents (video and/or audio).

The electronic device according to exemplary embodiments may prevent decline in voice recognition performance by state information of the external device by setting a voice recognition section and a voice signal input direction and so on differently according to whether the external device is connected or the audio is reproduced through the external device and so on.

The electronic device, according to the embodiments, may improve voice recognition performance by fixing a target direction to a direction in which a user's voice is uttered, amplifying a voice signal with respect to the fixed direction, and removing noise from an output sound which is input from a content reproducing device.

DETAILED DESCRIPTION OF EXEMPLARY EMBODIMENTS

Figure 1:
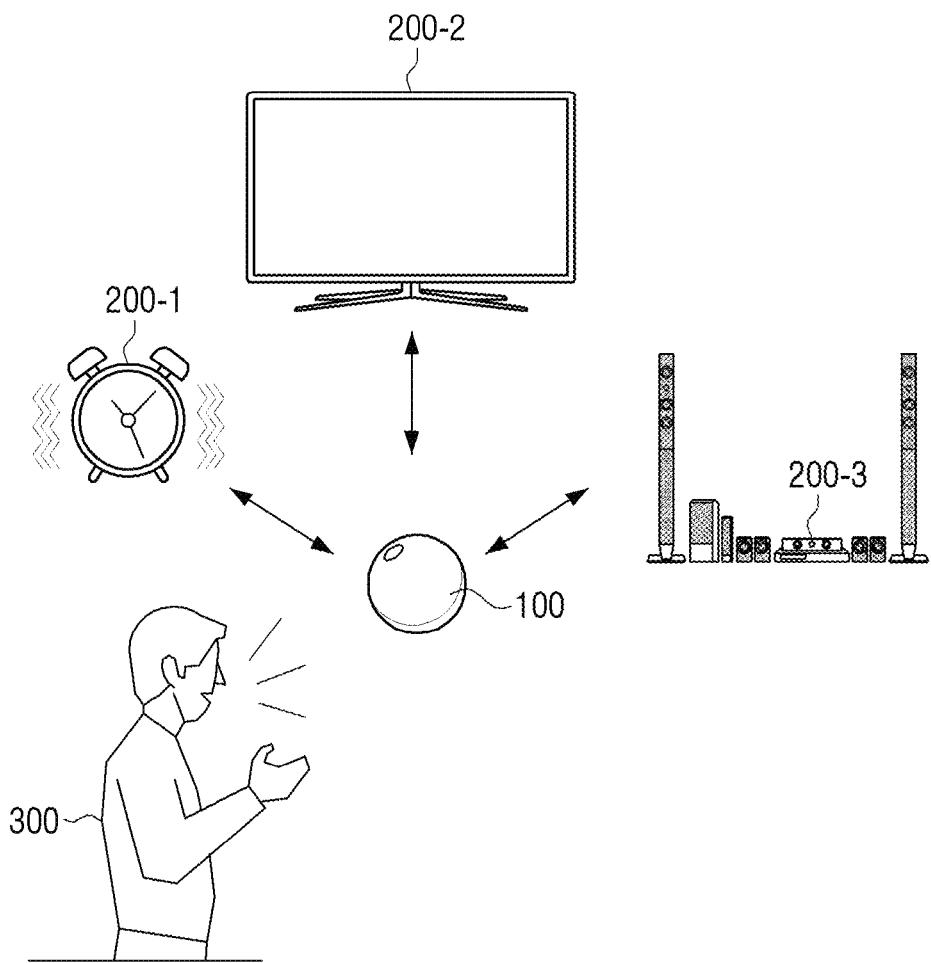
FIG. 1 is a view to describe a voice recognition environment of an electronic device according to an embodiment of the disclosure.

The terms used in this specification will be briefly described, and the disclosure will be described in detail.

According to embodiments, a "module" or "unit" performs at least one function or operation, and may be implemented as hardware or software, or a combination of hardware and software. In addition, a plurality of "modules" or a plurality of "units" may be integrated into at least one module and may be realized as at least one processor (not shown) except for "modules" or "units" that should be realized in a specific hardware.

Hereinbelow, certain embodiments will now be described in greater detail with reference to the accompanying drawings to enable those skilled in the art to work the same with ease. However, embodiments may be realized in a variety of different configurations, and not limited to descriptions provided herein. Further, those that are irrelevant with the description are omitted so as to describe embodiments more clearly, and similar drawing reference numerals are used for the similar elements throughout the description.

FIG. 1 is a view to describe a voice recognition environment of an electronic device according to an embodiment of the disclosure.

According to FIG. 1, a voice recognition environment 10 may include an electronic device 100 which is a voice recognition device, and external devices 200-1, 200-2, and 200-3 that communicate with the electronic device 100. According to one embodiment of the disclosure, the electronic device 100 may be a voice recognition device including a microphone array composed of a plurality of microphones. The plurality of microphones are the same as the multiple microphones. The electronic device 100 may receive a plurality of sound source signals as well as a user's voice.

The electronic device 100 can remotely control the external devices 200-1, 200-2, and 200-3 by recognizing the voice of a user 300 among the plurality of sound source signals that are received. For example, the external devices 200-1, 200-2, and 200-3 may be image reproducing devices capable of outputting contents including audio and/or video. For example, the external devices 200-1, 200-2, and 200-3 may be, but not limited to, an alarm device 200-1, a television 200-2, or a Bluetooth speaker 200-3, and so on. The electronic device 100 may be portable by the user.

Figure 2:
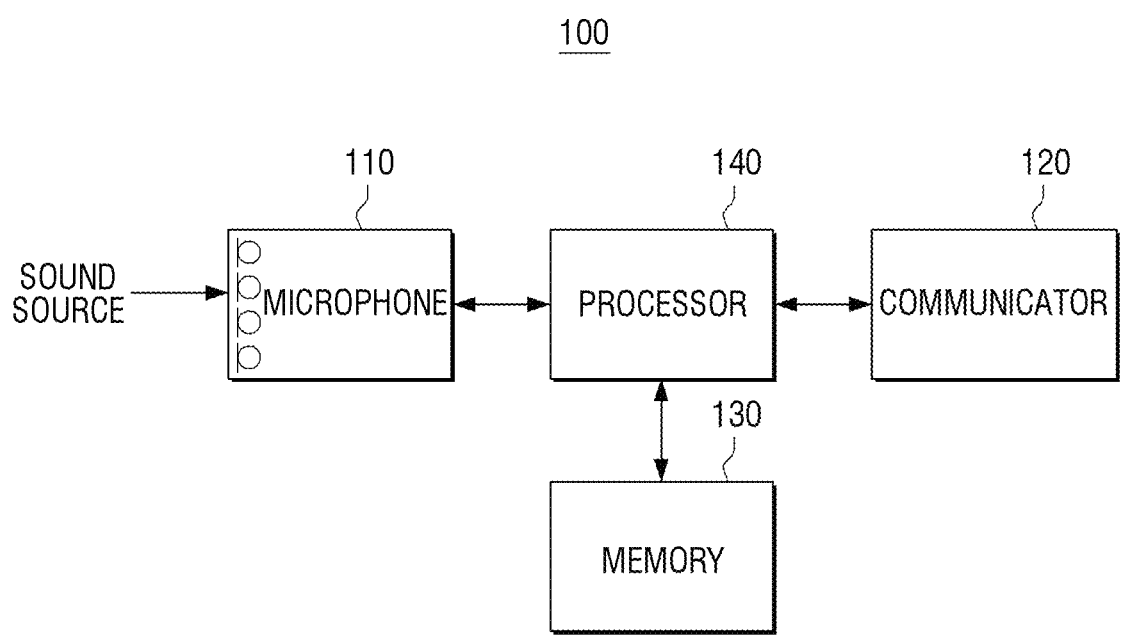
FIG. 2 is a simple block diagram which constitutes an electronic device according to an embodiment of the disclosure.

FIG. 2 is a simple block diagram which constitutes an electronic device according to an embodiment of the disclosure. The electronic device 100 includes a microphone 110, a communicator 120, a memory 130, and a processor 140.

The microphone 110 may receive an audio signal from a plurality of sound sources including a user's voice signal. The audio signal may include a voice signal. For example, the microphone 110 may receive a voice signal for remotely controlling an external device from the user 300 shown in FIG. 1 through a user voice, and may receive an audio signal from the sound source that is the external devices 200-1, 200-2, 200-3 can receive the audio signal from the sound source that is output by the external devices 200-1, 200-2, and 200-3.

According to one embodiment of the disclosure, the microphone 110 may have a microphone array configuration of a plurality (e.g., four) of microphones. Although the disclosure shows a microphone array including four microphones, the number of microphones is not limited thereto.

The microphone array including a plurality of microphones can estimate the input direction and distance of the sound source by using the gain and delay information of the audio input signal for each microphone. According to one embodiment of the disclosure, the microphone array may be made of directional or omnidirectional microphones and may be a mixed configuration of directional microphones and omnidirectional microphones.

The communicator 120 may be connected to network by wire or wirelessly as illustrated in FIG. 1 and communicate with the external devices 200-1, 200-2, and 200-3. The communicator 120 may receive state information of an external device according to information on connection with the electronic device 100.

The wireless communication may include at least one of a wireless fidelity (WFI), a Bluetooth (BT), a near field communication (NFC), a global positioning system (GPS), or a cellular communication (e.g., long term evolution (LTE), long term evolution-advanced (LTE-A), code division multiple access (CDMA), wideband code division multiple access (WCDMA), universal mobile telecommunications system (UMTS), wireless broadband internet (Wibro) or global system for mobile communications (GSM), etc.). The wired communication may include at least one of a universal serial bus (USB), a high definition multimedia interface (HDMI), a recommended standard 232 (RS-232) or a plain old telephone service (POTS).

The state information of the external device may be at least one of information on whether the external device and the electronic device 100 are connected, audio amplitude information from the image content output from the external device, type of the external device, position of the external device, angle of the external device, a distance from the external device to the electronic device 100, and a frequency characteristic of the speaker for outputting the image content of the external device. The image content may include video and/or audio.

Whether the external device is connected to the electronic device 100 may indicate whether the external device is connected to the electronic device 100 or is not connected to the electronic device 100 by wire or wirelessly.

The audio amplitude information that is output by the external device may indicate audio amplitude information from which whether audio amplitude that is output by the external device can be recognized as noise based on size of energy of a voice signal of a user recognized by the electronic device 100.

As described above with reference to FIG. 1, the type of an external device may be external devices capable of outputting image contents. For example, when the external device is a television, the type of the external device is a video device, and the output data information of the television may include a model name of the television, the audio characteristics of the output content of the television, characteristics of output audio frequency from among output contents of the television, but is not limited thereto.

The angle of the external device may indicate a relative angle of an output speaker of the external device and the microphone 110 of the electronic device 100 relative to the electronic device 100. For example, an angle from the electronic device 100 to an external device can be estimated (determined) by using delay time between signals that are input to each microphone of a plurality of microphones. Then, the electronic device 100 can determine the relative position information between the external device and the electronic device 100 from the estimated angle.

The frequency characteristics of a speaker for audio output of the external device are basic characteristics which represent characteristics of the speaker and may be data required to predict the reproduction band, the balance of voice range energy, and the approximate sound quality, but is not limited thereto.

The memory 130 may store state information of the external device. The memory 130 may save output audio volumes which are different according to types of the external device as data.

A position of the external device can indicate a relative position of the external device with respect to the position of the electronic device 100. For example, a position of the external device may be determined through position information of sound source. The position information of the sound source may mean a direction in which sound source which is emitted from the external device with respect to the microphone 110 is positioned.

That is, directions of the sound sources reaching the respective microphones from the sound sources may be different according to the direction of the arrangement of the plurality of microphones. Therefore, position information of the external device can be determined with the center of the arrangement of the plurality of microphones as a reference point. The memory 130 may store a program module such as a mode determination module 310 for determining the state information of the external device shown in FIG. 3, a voice detection module 320 for pre-processing a signal, an angle estimation module 330, a beamformer module 340, and a voice recognition module 350 for voice recognition of a preprocessed voice signal and outputting a voice recognition result, but is not limited thereto.

The memory 130 may include an internal memory or an external memory. The internal memory may include at least one of a volatile memory or a non-volatile memory. The volatile memory may be, for example, dynamic random access memory (DRAM), static random access memory (SRAM), synchronous dynamic random access memory (SDRAM), or the like. Non-volatile memories include, for example, one time programmable ROM (OTPROM), programmable ROM (PROM), erasable and programmable ROM (EPROM), electrically erasable and programmable ROM (EEPROM), mask ROM, flash ROM, NAN flash memory, NOR flash memory, and so on. Also, the internal memory may be a solid state drive (SSD).

The external memory may include a flash drive, a compact flash (CF), a secure digital (SD), a micro secure digital (micro-SD), a mini secure mini digital (mini-SD), an extreme digital (xD), a memory stick, or the like. The external memory may be operatively coupled to the electronic device 100 via a variety of interfaces. In addition, the electronic device 100 may further include a storage device such as a hard drive.

The processor 140 may determine the noise environment around the electronic device 100 based on at least one of the audio amplitude information which is received by the microphone 110 and is output by the external device and the state information of the external device which is received by the microphone 110. The processor 140 may process the voice signal based on the determined noise environment and perform voice recognition.

The processor 140 controls the program module stored in the memory and overall operations of the electronic device 100, and detailed description of the processor 140 will be described with reference to FIG. 3.

Figure 3:
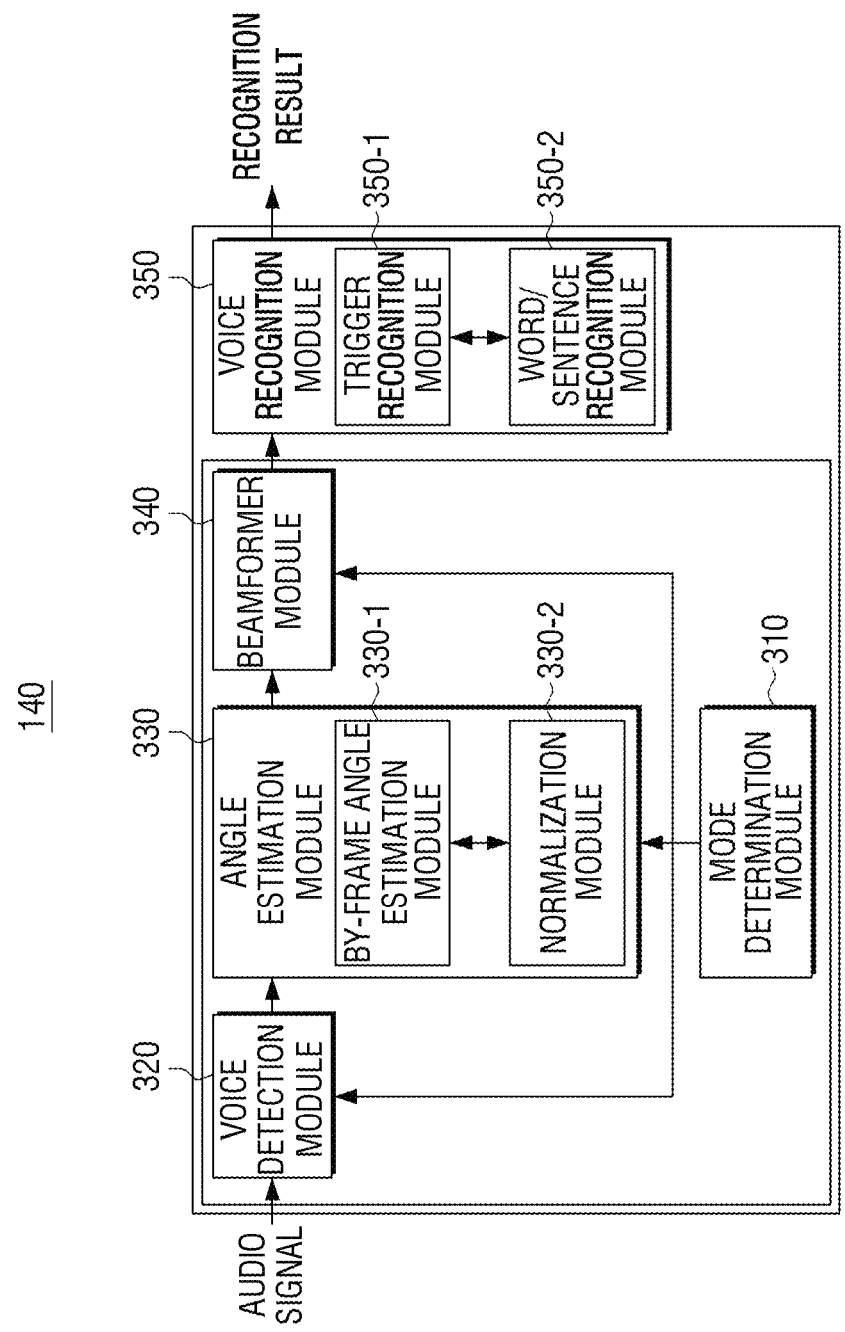
FIG. 3 is a detailed block diagram which illustrates a detailed module constituting the processor according to an embodiment of the disclosure.

FIG. 3 is a detailed block diagram which illustrates a detailed module constituting the processor according to an embodiment of the disclosure.

Referring to FIG. 3, the processor 140 may process, as described in FIG. 2, the mode determination module 310, the voice detection module 320, the angle estimation module 330, the beamformer module 340, and the voice recognition module 350.

In general, a voice recognition device including a plurality of microphones includes the voice detection module 320, the angle estimation module 330, and the beamformer module 340, which are preprocessing parts of a voice signal, and the voice recognition module 350 which is a voice recognition part to recognize the pre-processed voice signal.

Generally, in the voice recognition device including a plurality of microphones, the preprocessor may create a direction of an audio signal from which noise is removed and a sound source (a voice signal), a result of detection of a sound source (voice signal) (begin of speech (BOS), end of speech (EOS)), and the like and transmit the same to the voice recognition module 350.

That is, a general voice recognition device which includes a plurality of microphones does not include the mode determination module of the disclosure.

When the amplitude of the audio output by the external device is equal to or greater than a predetermined value based on the state information of the external device, the mode determination module 310 according to one embodiment of the disclosure may determine the noise environment around the electronic device 100 as the first mode. When the amplitude of the audio output from the external device is less than the predetermined value or the external device is not connected to the electronic device 100 based on the state information of the external device, the noise environment around the electronic device 100 can be determined as the second mode.

For example, when an external device reproduces audio, or amplitude of output audio which an external device is reproducing has a value higher than a voice signal energy of a user, the mode determination module 310 may determine the mode as the first mode in which noise environment around the electronic device 100 is noise mode. The relative amplitude of output audio of an external device according to amplitude of voice signal energy of a user can be pre-stored in a memory of the electronic device 100.

For example, it is assumed that voice signal energy amplitude is set from 1 to 10 in an ascending order from the lowest voice amplitude to the highest voice amplitude. In this case, if the output audio amplitude of the external device is 5 or more which is amplitude of voice, the mode termination module 310 may determine the noise environment around the electronic device 100 to be the first mode which is a noise mode.

When the external device is not connected to the electronic device 100 or the output audio amplitude of the external device is less than 5, which is the voice amplitude, the mode determination module 310 may determine that the surrounding noise environment is in the second mode which is an idle mode. The above-described examples are only illustrative of the disclosure, but are not limited thereto.

The mode determination module 310 may store the initialized state information of the external device in the memory 130 at the time when the external device is connected to the electronic device 100 for the first time. The processor 140 may update and determine the noise environment around the electronic device based on the state information of the external device whenever the external device is connected to the electronic device 100.

For example, the mode determination module 310 can automatically detect the state information of the external device at the moment when the external device is connected to the electronic device 100. The mode determination module 310 can initialize the external device at the time when the external device is initially connected to the electronic device 100, measure and store state information of each external device. When the external device corresponding to the state information of the stored external device is connected to the electronic device 100, the mode determination module 310 may determine the noise environment around the electronic device 100 (e.g., a first mode which is a noise mode, and a second mode which is an idle mode).

A method for initializing to store state information may be a method to output a signal for measurement (for example: sweep, white noise, etc.) through the external device, and analyze a signal which is input to the microphone of the electronic device 100.

For example, as state information of the external device, the mode determination module 310 may predict a distance to the corresponding external device based on time difference between an output signal of the external device and a microphone input signal of the electronic device 100 and a degree of sound source reduction.

The mode determination module 310 can estimate (determine) the angle from the electronic device 100 to the external device using the delay time between signals input to each microphone of the plurality of microphones. The mode determination module 310 can determine the relative position information between the external device and the electronic device 100 from the estimated angle and distance.

The mode determination module 310 can compare the measurement signal with the signal input to the microphone of the electronic device 100 and estimate (determine) the speaker output characteristic of the external device. The mode determination module 310 may measure the microphone frequency characteristics of the electronic device 100 in advance and store the measured frequency characteristics in the memory 130.

The voice detection module 320 may detect a voice signal section composed of a plurality of continued frames from an audio signal according to a mode determined by the mode determination module 310.

According to one embodiment of the disclosure, the electronic device 100 may receive audio signals from a plurality of microphones. The angle estimation module 330 may determine an input direction of audio signals in each of the plurality of microphones based on a voice section detected from the voice detection module 320 according to a mode determined by the mode determination module 310.

The beamformer module 340 may perform beamforming based on the input direction of the audio signal determined by the angle estimation module 330 according to the mode determined by the mode determination module 310 and process a voice signal. The voice recognition module 350 of the processor 140 may decode the preprocessed audio signal to produce a voice recognition result.

Generally, the voice detection module 320 can detect a plurality of subsequent frames including a noise interval (frame) and a voice interval (frame) from an audio signal. The voice detection module 320 can detect a voice section and a noise section using various algorithms for separating voice from an audio signal input to a microphone in a voice recognition technology. The voice section information generated by the voice detection module 320 may be input to the angle estimation module 330 and the beamformer module 340.

Generally, the voice detection module 320 designates a hang-over section to increase the stability of the detection result. The hang-over refers to a minimum period of time in which a frame after a frame in which a voice is detected in a plurality of frames is also determined as a voice. For example, when the hang-over length is set to infinity, all the frames after the frame determined as a voice once can be all detected as a voice. In contrast, if the hang-over length is minimum, voice is determined independently for all the frames. Accordingly, the setting of the hang-over length plays an important role in the reliability of the result of the voice recognition section detected by the voice detection module 320.

According to one embodiment of the disclosure, the voice detection module 320 can adjust the hang-over length based on the status information of the external device. The voice detection module 320 sets the hang-over length to a first length when the noise environment around the electronic device 100 is the first mode (noise mode), and when the surrounding noise environment is the second mode (Idle mode), the voice section can be detected by setting the hang-over length to a second length that is longer than the first length.

For example, when the noise environment around the electronic device 100 is determined to be the first mode in the mode determination module 310, the voice detection module 320 may relatively reduce the hang-over length to improve robustness against noise in performing a method for detecting a voice section. When the noise environment around the electronic device 100 is the first mode, it may be the state that noise of the surrounded environment such as output audio amplitude by an external device is large.

When the mode determination module 310 determines that the noise environment around the electronic device 100 is the second mode, the voice detection module 320 may increase the hang-over length relatively and improve the voice detection performance. When the ambient noise environment of the electronic device 100 is the second mode, the external device may not be connected to the electronic device 100, or may be in a state of reproducing only a small output or no output of the external device, According to one embodiment of the disclosure, the voice detection module 320 can adjust a weight value of a frame determined as a voice section in a plurality of frames according to the determination result of the mode determination module 310. When the noise environment around the electronic device 100 is in the first mode, the voice detection module 320 may increase the weight value of a frame determined as a section other than a voice section from the audio signal, and when the environment is in the second mode, a weighted value of a frame determined as a voice section from an audio signal can be increased to detect a voice section.

For example, in case of the first mode which is a noise mode, a weight value which will be determined as a section other than a voice section can be set to high, and in case of the second mode which is an idle mode, a weight value which will be determined as a voice section may be set to high and the voice section can be detected.

In the first mode, which is a noise mode, the weight (or weight value) may be adjusted using additional information such as frequency characteristics of the electronic device 100. For example, when the frequency band of an external device connected to the electronic device 100 has a low gain in a low frequency band and a high gain in a high frequency band, while audio (or audio output) is being reproduced through the external device, a high weight can be given to a low frequency band and the detection performance can be enhanced.

The general angle estimation module 330 includes a plurality of frame-by-frame angle estimation modules 330-1 and a normalization module 330-2. The frame-by-frame angle estimation module 330-1 may generate the target direction angle information from the audio signal on a frame-by-frame basis. When only voice signals are present in the audio signal, the frame-by-frame angle estimation module 330-1 can generate frame-by-frame angle information with small dispersion and is distributed to be to the actual target direction. When there is a lot of noise in the audio signal, the frame-by-frame angle estimation module 330-1 can generate frame-by-frame angle information distributed evenly in all directions. At this time, since the normalization module 330-2 operates at an equal ratio with respect to all possible input directions, the angle estimation module 330 sensitively may react to the noise input signal sensitively and there is a problem that changes of the estimated angle information are drastic.

The angle estimation module 330 according to an embodiment of the disclosure may set a search range in consideration of a weight for each angle at which an audio signal can be input based on the result determined by the mode determination module 310. Accordingly, the angle estimation module 330 can generate the normalized angle information by estimating the most probable direction for each situation according to the input direction of the audio signal.

The angle estimation module 330 according to an embodiment of the disclosure may determine an input direction of an audio signal. To be specific, when noise environment around the electronic device 100 is the first mode, the angle estimation module 330 may set the input angle search range in a direction to which audio signals are inputtable to a first range that is in a left direction and a right direction from the angle generated in the previous frame of the detected voice section. When the noise environment around the electronic device 100 is the second mode, the angle estimation module 330 may set a search range of the input angle of the audio signal in a direction to which audio signals are inputtable to a second range, which is wider than the first range, in a left direction and a right direction from the angle generated in the previous frame of the detected voice section.

For example, the angle estimation module 330, in case of the first mode which is a noise mode, may set a range which is narrower in a right and left direction of the angle generated in the previous frame as a search range. In case of the first mode, the angle estimation module 330 may adjust a search range using additional information along with the result determined by the mode determination module 310.

For example, when position information of the external device that is connected to the electronic device 100 is received together, the angle estimation module 330 may set a section which excludes a direction of an external device as a search range and improve a capability to respond to noise. In case of the second mode, the angle estimation module 330 may set a range which is wider in a left direction and a right direction that are generated in the previous frame as a search range.

In addition, the angle estimation module 330 may set to track an input direction of the audio signal or to fix the input direction of the audio signal based on the result determined by the mode determination module 310. The angle estimation module 330, when the noise environment around the electronic device 100 is in the first mode, may fix a target direction to estimate an input direction of the audio signal, and the audio signal of a frame which is received after the detected voice section is amplified with respect to the fixed target direction. When the noise environment around the electronic device 100 is in the second mode, the angle estimation module 330 may set the target direction to estimate an input direction of an audio signal as all directions and determine an input direction of an audio signal in all input angle ranges.

For example, in the first mode, the angle estimation module 330 fixes a target direction of the angle estimation module 330 as a tracking direction of an audio signal when trigger speech of a user is recognized by the trigger recognition module 350-1 of the voice recognition module 350, and a user's speech which continues thereafter can be amplified with respect to the fixed target direction and can be transferred to the words and/or sentence recognition module 350-2 of the voice recognition module 350. In case of the second mode, the angle estimation module 330 may be set so that all the angles in every direction are included in the estimated angle range of the voice input direction.

Generally, the beamformer module 340 includes a fixed beamformer (not shown), a blocking matrix (not shown), a multiple-input canceller (not shown), and a post-filter (not shown). In this case, the fixed beamformer may receive the input angle information of the audio signal and the audio signal, amplify the signal input in the corresponding angle direction, and generate the amplified audio signal in the target direction.

General angle estimation module 330 may be normalized at the ratio which is equal for all the inputtable directions and estimate an input angle, and the beamformer module 340 uses the angle information generated by the angle estimation module 330 as inputs of the fixed beamformer and the block matrix. Therefore, the general beamformer module 340 may cause voice distortion as voice in the target direction is removed.

According to an embodiment of the disclosure, the beamformer module 340 may fix a target direction or set a target direction in the angle estimation module 330 as all the directions according to the determination result of the mode determination module 310, and receive an input direction of the generated voice.

According to an embodiment of the disclosure, the voice recognition module 350 may perform voice recognition processing on the preprocessed voice signal based on the state information of the external device determined by the mode determination module 310, and output the processed voice signal. The configuration of the voice recognition module 350 of the disclosure may be similar to that of a general voice recognition module and may be embodied in the main board of the electronic device 100. For example, the trigger recognition module 350-1 included in the voice recognition module 350 can be implemented in the middleware (M/W) of the electronic device 100, and the word and/or sentence recognition module 350-2 which requires high calculation amount and data amount can be implemented in the server.

Figure 4:
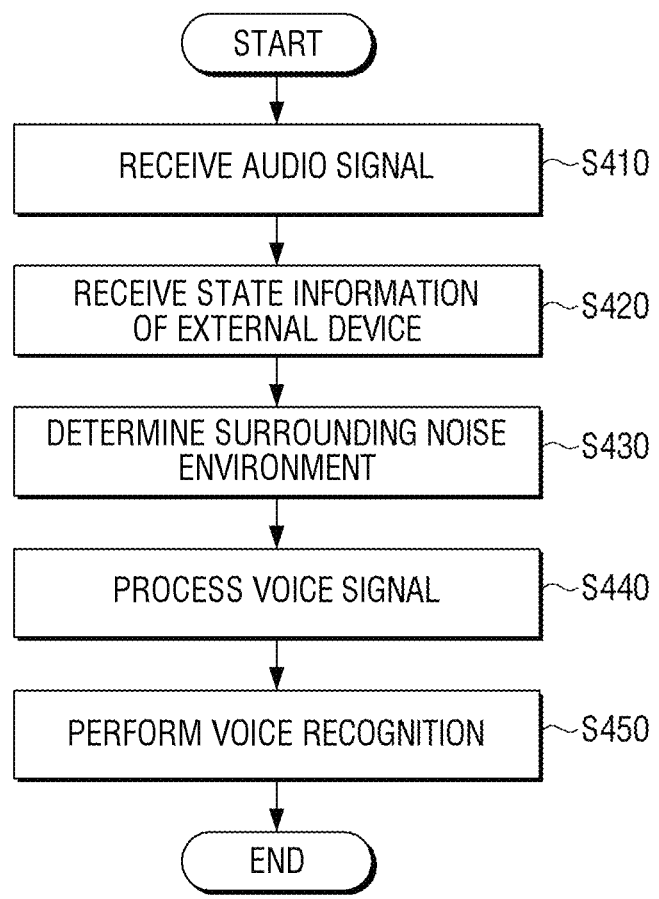
FIG. 4 is a flowchart to describe a signal processing method for voice recognition according to an embodiment of the disclosure.

FIG. 4 is a flowchart to describe a signal processing method for voice recognition according to an embodiment of the disclosure.

In step S410, the electronic device 100 may receive a plurality of audio signals including a voice signal through a microphone array that includes a plurality of microphones.

In step S420, the electronic device 100 may be connected to the electronic device 100 by wire or wirelessly and receive state information of the external device from the external device that performs network communication. Steps S410 and S420 are described for convenience of description only, and the order is not limited thereto, and the electronic device 100 may simultaneously receive the audio signal and the state information of the external device. Since the state information of the external device has been described in detail with reference to FIG. 2 and FIG. 3, the description thereof will be omitted.

In step S430, the electronic device 100 may determine a noise environment around the electronic device 100 based on the state information of an external device. Determination of the noise environment around the electronic device 100 was described with reference to the mode determination module 310 of FIG. 3, and will not be further described.

In step S440, the electronic device 100 can perform preprocessing, which is audio signal processing, based on the noise environment around the electronic device 100 according to the state information of the external device. In general, the preprocessor including the voice detection module 320, the angle estimation module 330, and the beamformer module 340 described in FIG. 3 has a relatively simple operation and requires a high processing speed and thus can be implemented as an independent digital signal processor (DSP). The preprocessing process of the audio signal according to the embodiment of the disclosure has been described in detail through the voice detection module 320, the angle estimation module 330, and the beamformer module 340 of FIG. 3 and thus will not be described.

In step S450, the electronic device 100 may perform voice recognition based on the preprocessed voice signal and output the voice recognition result.

Figure 5:
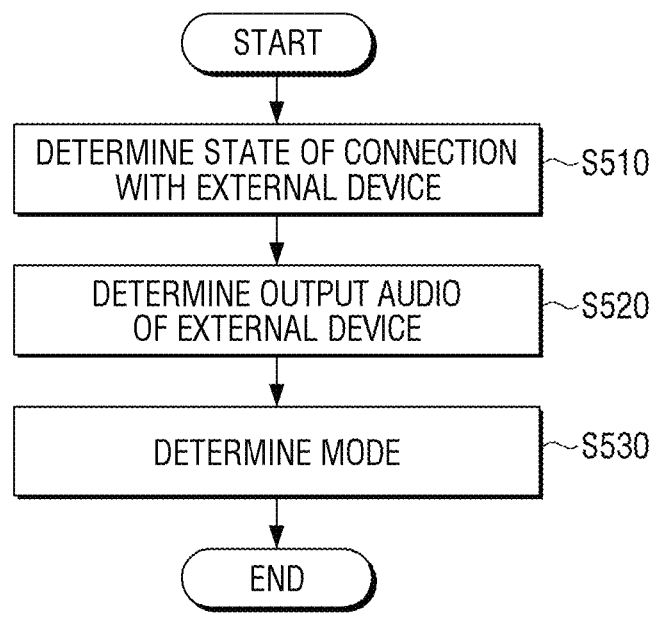
FIG. 5 is a flowchart to describe a noise environment mode according to state information of an electronic device according to an embodiment of the disclosure.

FIG. 5 is a flowchart to describe a noise environment mode according to state information of an electronic device according to an embodiment of the disclosure.

In step S510, the electronic device 100 can determine whether it is connected to an external device. The electronic device 100 can determine whether it is connected to an external device through a wired and/or wireless network communication. When the external device is first connected to the electronic device 100, the electronic device 100 may receive the initialized state information of the external device at the time when the external device is connected to the electronic device 100, and store the same in the memory 130 of FIG. 2.

In step S520, the electronic device 100 may determine the output audio of the external device. The electronic device 100 can determine the state information of the external device such as the output audio amplitude of the external device, the speaker frequency characteristics of the external device, the type of the external device, and the location of the external device. Since the state information of the external apparatus has been described with reference to FIG. 2 and FIG. 3, the description thereof is omitted.

In step S530, the electronic device 100 may determine the noise environment (the first mode, the second mode, and the like) around the electronic device 100 based on the output audio amplitude of the external device and the state information of the external device. Since the mode determination method according to the embodiments of the disclosure has been described in detail in the mode determination module 310 of FIG. 3, description thereof is omitted. In the disclosure, the first mode which is the noise mode and the second mode which is the idle mode were exemplified but they are not limited thereto. The electronic device 10 may determine noise environment (first mode, second mode, third mode, etc.) according to a noise state.

Figure 6:
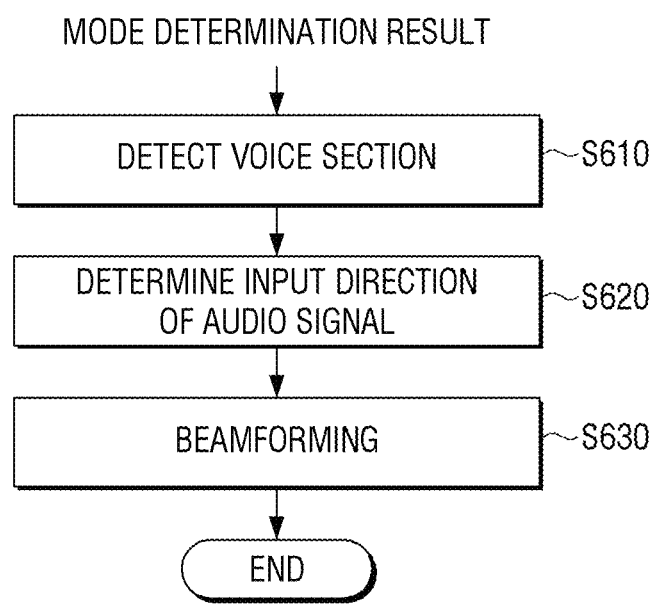
FIG. 6 is a flowchart to describe an audio signal preprocessing method according to state information of an electronic device according to an embodiment of the disclosure.

FIG. 6 is a flowchart to describe an audio signal preprocessing method according to state information of an electronic device according to an embodiment of the disclosure.

In step S610, the electronic device 100 can detect a voice section of an audio signal in a different manner according to the modes (first mode and second mode) determined by the mode determination module 310 of FIG. 3. An audio signal including a voice signal may be composed of a plurality of frames. The subsequent frames may include overlapping ranges. The plurality of frames may be arranged in chronological order. The electronic device 100 may assign a weighted value on a particular frame. A method of detecting a voice section in an audio signal refers to the voice detection module 320 of FIG. 3.

In step S620, the electronic device 100 can determine an input direction of the audio signal in the voice section detected in step S610 based on the determination result of the mode determination module 310 of FIG. 3. The input direction of the audio signal may be the input direction of the user's voice signal (sound source). The method of determining the input direction of a voice signal refers to the angle estimation module 330 of FIG. 3.

In step S630, the electronic device 100 may receive the input direction of the voice signal determined in step S620 based on the determination result of the mode determination module 310 of FIG. 3, perform beamforming, and preprocess a voice signal. The beamforming method refers to the beamforming module 340 of FIG. 3.

Figure 7A:
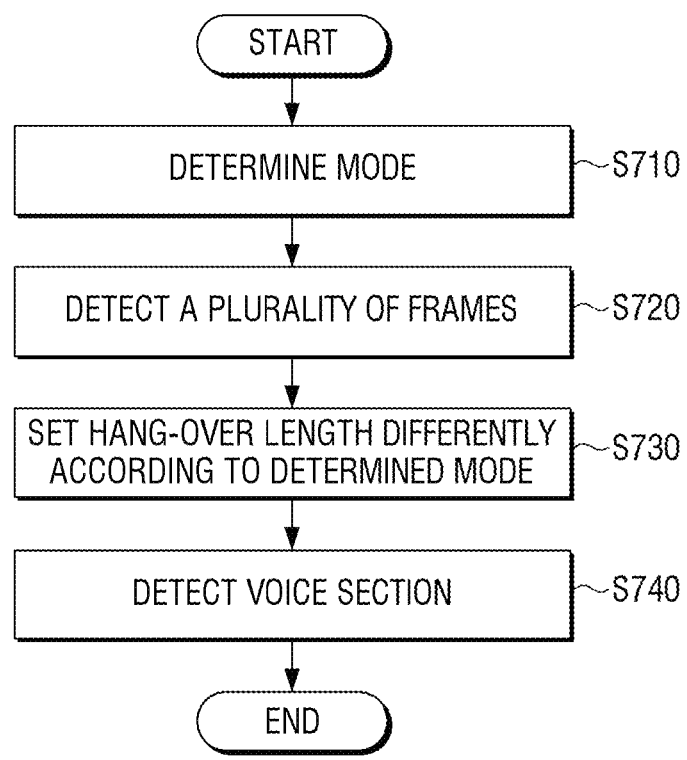
FIG. 7A is a flowchart to describe a method for voice section detection method according to an embodiment of the disclosure.
Figure 7B:
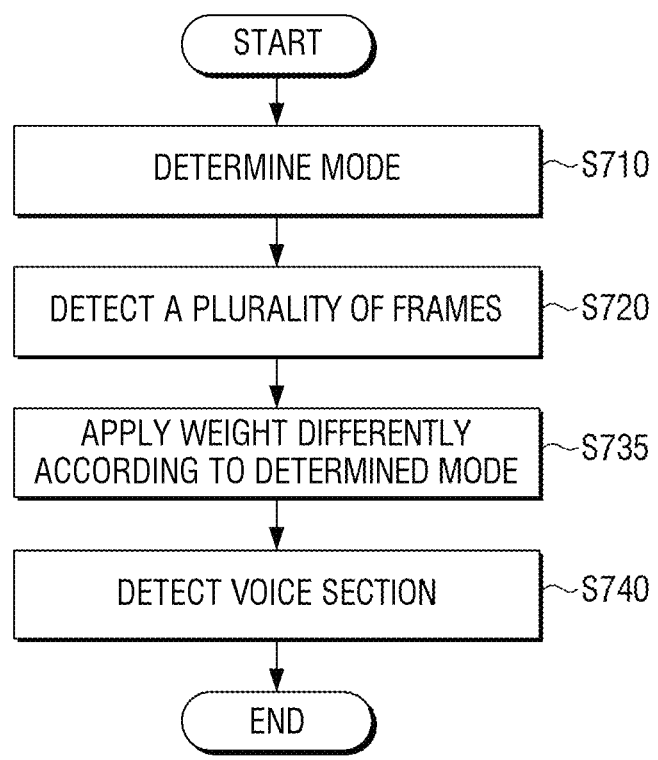
FIG. 7B is a flowchart to describe a method for voice section detection method according to an embodiment of the disclosure.

FIGS. 7A and 7B are flowcharts to describe a method for voice section detection method according to an embodiment of the disclosure. In order to avoid overlapping of descriptions, steps which perform the same method in FIGS. 7A and 7B include the same reference numerals.

In step S710, the electronic device 100 may determine the noise environment around the electronic device 100 according to state information such as whether the external device is connected and the output audio amplitude of the external device. For example, when the external device communicates with the electronic device 100, and the external device is reproducing audio, the electronic device 100 may determine that the noise environment around the electronic device 100.

For example, when the output audio amplitude of the external device is greater than or equal to audio amplitude which is recognized as noise mode pre-stored in the electronic device 100, the electronic device 100 may determine the noise environment around the electronic device 100 as the first mode which is the noise mode.

In the meantime, when the output audio amplitude of the external device is less than the audio amplitude recognized in the noise mode previously stored in the electronic device 100, the electronic device 100 may determine that the noise environment around the electronic device 100 as the second mode which is the idle mode. When the external device is not connected to the electronic device 100, the electronic device 100 may determine the noise environment around the electronic device 100 as the second mode.

In step S720, the electronic device 100 may detect a plurality of frames from an audio signal by methods different according to a determined noise environment (first mode, second mode).

In step S730 of FIG. 7A, the electronic device 100 may differently set a hang-over length according to a mode which is determined in step S710.

When the determined mode is the first mode, the electronic device 100 can relatively reduce the hang-over length, which is the minimum period of time in which a frame after a frame in which a voice is detected in a plurality of frames is also determined as a voice. Thus, the electronic device 100 can independently determine the voice for all subsequent frames that have been determined to be voice. In contrast, if the determined mode is the second mode, the electronic device 100 can relatively increase the hang-over length. Therefore, the electronic device 100 may detect frames in a section which is comparatively longer, from among the subsequent frames of the frame which is determined to be a voice, as a voice.

In step S735 of FIG. 7B, the electronic device 100 may apply weighted values to each frame from among a plurality of frames according to a mode determined in the step S710.

If the determined mode is the first mode, the electronic device 100 can detect and remove a noise section in an audio signal by applying a weight to a section (frame) rather than a voice section in a plurality of frames. When the determined mode is the second mode, the electronic device 100 can accurately detect the voice section in the audio signal by applying a high weight to the section determined as a voice in a plurality of frames.

In step S740, the electronic device 100 may detect a voice section composed of a plurality of frames from an audio signal based on at least one of step S730 and step S735.

Figure 8A:
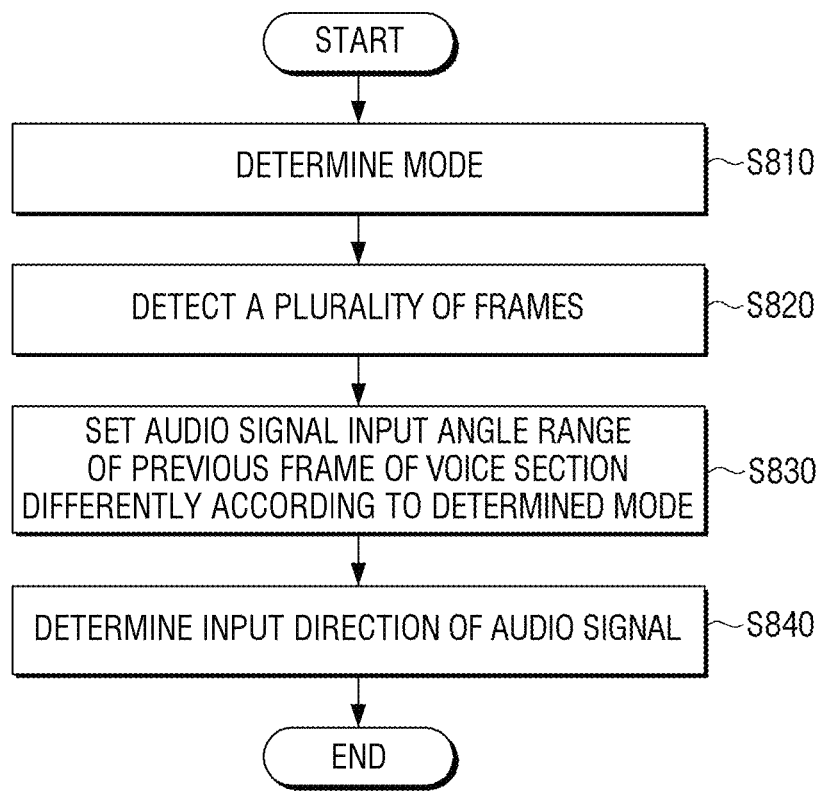
FIG. 8A is a flowchart to describe a method for determining an audio signal input direction according to an embodiment of the disclosure.
Figure 8B:
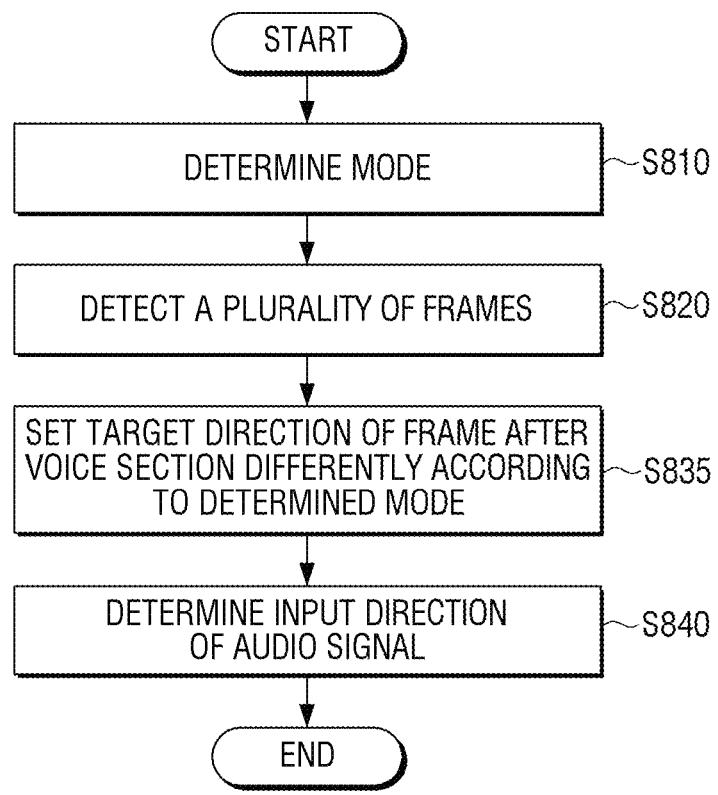
FIG. 8B is a flowchart to describe a method for determining an audio signal input direction according to an embodiment of the disclosure.

FIGS. 8A and 8B are flowcharts for describing an audio signal input direction determination method according to an embodiment of the disclosure. In order to avoid duplication of description, the same reference numerals are used for the steps of performing the same method in FIGS. 8A and 8B.

Steps S810 and S820 of FIGS. 8A and 8B are the same as steps S710 and S720 of FIGS. 7A and 7B and thus will be omitted.

In step S830 of FIG. 8A, the electronic device 100 may set an angle range of the audio signal input in a previous frame of the voice section according to a noise environment (first mode, second mode) around the electronic device 100.

For example, in the first mode, which is a noise mode, the electronic device 100 may narrow the input angle search range of the input direction of the audio signal to the left and right angles generated in the previous frame of the detected voice section. In contrast, in the second mode, which is an idle mode, the electronic device 100 can set a wide range of left and right angles generated in the previous frame to the search range.

In step s835 of FIG. 8B, the electronic device 100 may differently set a target direction which is an incident direction of a voice signal according to a noise environment (first mode, second mode) around the electronic device 100.

For example, in the first mode, which is the noise mode, the electronic device 100 may fix the target direction for estimating the input direction of the audio signal, and amplify the audio signal of the frame which is received after the voice section that is detected in step S740 of FIGS. 7A and 7b with respect to the fixed target direction. In case of the second mode which is an idle mode, the electronic device 100 may not fix the target direction to estimate the input direction of the audio signal and set the direction to entire directions.

In step S840, the electronic device 100 may determine an input direction of the voice signal (sound source) from the audio signal based on at least one of the step S830 and S835.

Figure 9:
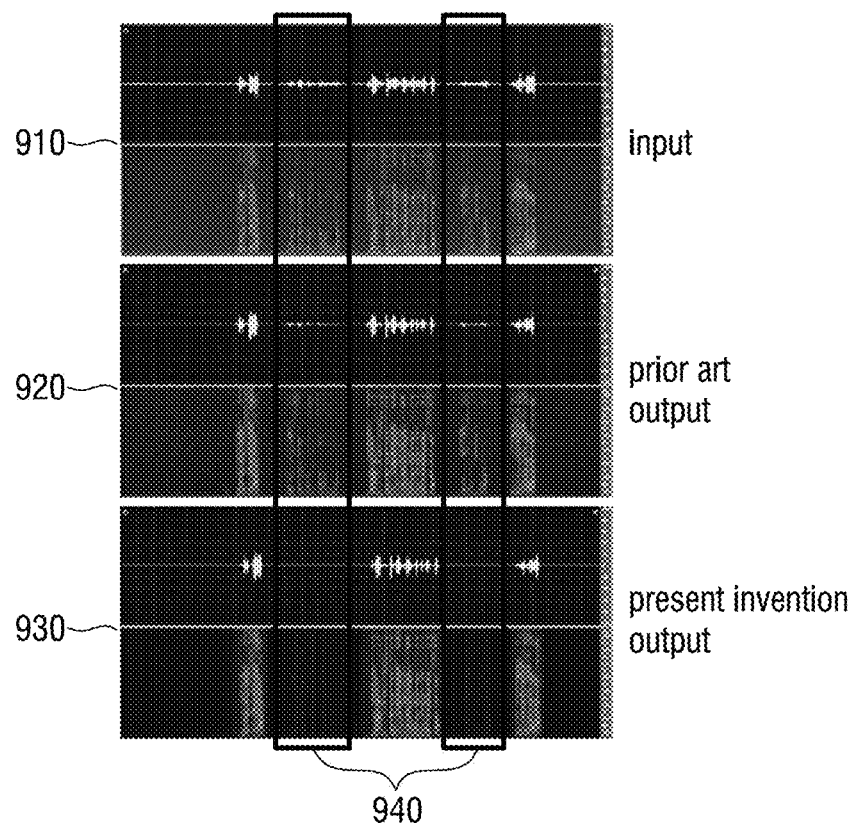
FIG. 9 is a view which illustrates a noise improvement result according to an embodiment of the disclosure.

FIG. 9 is a view which illustrates a noise improvement result according to an embodiment of the disclosure. Specifically, FIG. 9 is a graph which illustrates an experimental result that a user is positioned at a degree of zero of the electronic device 100, and an external device is positioned at a degree of 90 of the electronic device 100.

Referring to FIG. 9, an input signal 910 may include an output audio signal 940 of the electronic device and the sound signal.

For example, a user giving a voice command to the electronic device 100 may be located at a distance of one meter (m) from the electronic device 100. In addition, an external device that is a content reproducing device may be located at a distance of 3 meters (m) from the electronic device 100. The electronic device 100 can simultaneously receive audio signals from a user and an external device through a plurality of microphones.

According to a preprocessing method 920 of the conventional voice recognition device, the output audio signal 940 of the external device is included as noise even after the preprocessing process of the audio signal. That is, the user's voice signal is preserved or amplified, but the output audio signal 940 of the external device is damaged or substantially removed. When the conventional voice recognition preprocessing method is used, the electronic device 100 can predict the destination direction by repeatedly moving the direction (0 degree) of the user and the direction (90 degrees) of the external device. Therefore, there is a problem that the adaptation of the filter of the beamformer occurs, and the output audio signal 940 of the external device is included in the output signal.

In accordance with the preprocessing method 930 according to an embodiment of the disclosure, after the preprocessing of audio signal, the output audio signal 940 of the external device can be significantly reduced compared to the conventional preprocessing process 920.

Referring to FIG. 9, unlike the conventional voice recognition device processing method 920, the preprocessing method 930 of the disclosure preserves or amplifies the user's voice signal, and removes all the audio output signal 940 of the external device. According to one embodiment of the disclosure, the electronic device 100 may fix the target direction to the user's location (0 degrees) and block all incoming sound sources for directions other than the target direction. That is, the electronic device 100 can enhance the voice recognition function by amplifying the voice signal incoming in the target direction of the user's location (0 degree). Thus, in accordance with the embodiments of the disclosure, the audio signal preprocessing method of the electronic device 100 can improve the robustness against noise by using the noise environment around the electronic device 100 determined based on the state information of the external device connected to the electronic device 100.

Further, according to the embodiments of the disclosure, the electronic device 100 is a device equipped with a voice recognition function, and can remotely operate an external device for which the electronic device 100 supports image (video and/or audio) contents reproducing. At this time, the electronic device 100 may avoid degradation of voice recognition function by audio output of the external device by differently detecting voice recognition sections and signal input directions or the like, according to state information such as whether the external device is connected and audio is reproduced.

Figure 10:
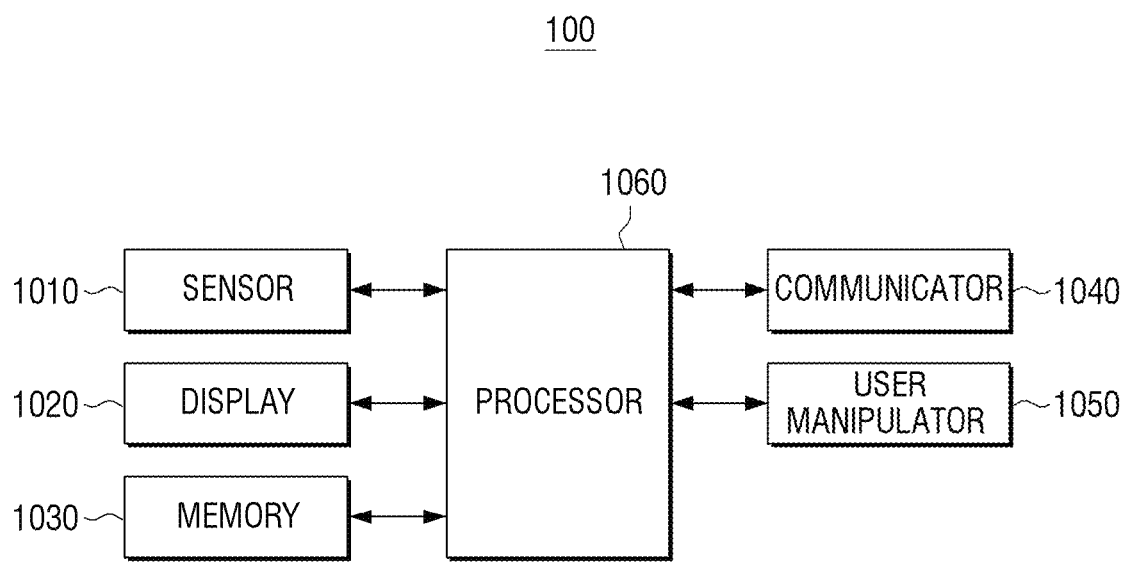
FIG. 10 is a block diagram which constitutes an electronic device according to an embodiment of the disclosure.

FIG. 10 is a block diagram which constitutes an electronic device 100 according to an embodiment of the disclosure.

As illustrated in FIG. 10, the electronic device 100 may include a sensor 1010, a display 1020, a memory 1030, a communicator 1040, a user manipulator 1050, and a processor 1060.

According to embodiments, a part of the components of FIG. 10 can be omitted or changed, and another component can be further included.

The sensor 1010 may include a plurality of sensors capable of detecting movement of the electronic device 100. The sensor 1010 may include various sensors such as a motion sensor, gyroscope sensors, acceleration sensors, barometers, thermal sensors, humidity sensors, and ultrasonic sensors. The above-mentioned examples are merely one embodiment, but are not limited thereto.

The display 1020 may include a touch display.

The memory 1030 stores various modules for driving the electronic device 100. It should be understood that the memory 1030 may include various program modules, but the various program modules may be omitted, modified or added depending on the type and characteristics of the electronic device 100. Since the memory 1030 is the same as the memory 130 described above with reference to FIG. 2, a detailed description thereof will be omitted.

The communicator 1040 communicates with various types of external devices according to various types of communication methods. The communicator 1040 may include various communication chips such as a Wi-Fi chip, a Bluetooth chip (including a Bluetooth BLE), an NFC chip, a wireless communication chip, an IR chip, and the like. At this time, the Wi-Fi chip, the Bluetooth chip, the NFC chip, and the IR chip communicate with each other using WiFi, Bluetooth, NFC, or IR. Among these, the NFC chip refers to a chip operating in the Near Field Communication (NFC) mode using the 13.56 MHz band among various RF-ID frequency bands such as 135 kHz, 13.56 MHz, 433 MHz, 860 to 960 MHz and 2.45 GHz. When a Wi-Fi chip or a Bluetooth chip is used, various connection information such as an SSID and a session key may be transmitted and received first, and communication information may be used to transmit and receive various information. The wireless communication chip means a chip that performs communication according to various communication standards such as IEEE, ZigBee, 3rd Generation (3G), 3rd Generation Partnership Project (3GPP), and Long Term Evolution (LTE).

The user manipulator 1050 receives various user commands for controlling the electronic device 100. The user manipulator 1050 may be realized by a remote controller having a four direction key, but it is only one embodiment, and it is possible to use a motion input unit including a pointing device equipped with a motion sensor, a keyboard, a mouse, and a camera, a voice inputter equipped with a microphone, and a touch sensor.

The processor 1060 controls overall operations of the electronic device 100 using various programs stored in the storage 1030. The processor 1060 has been described in FIGS. 2 and 3 and will not further described.

The device (for example: modules or the electronic device 100) or methods (for example: operations) can be performed by, for example, at least one computer (for example: processor 1060) which performs instructions included in at least one program from among the programs maintained in the computer-readable storage media.

When the instructions are executed by the computer (for example: processor), the at least one computer can perform a function corresponding to the instructions. The computer-readable storage medium may be, for example, the memory 1030.

The program may be stored on a computer readable recording medium such as, for example, a hard disk, a floppy disk, magnetic media (e.g. magnetic tape), optical media (e.g., compact disc read only memory (CD-ROM), digital versatile disc (DVD), magneto-optical media such as floptical disks, hardware devices such as read only memory (ROM), random access memory (RAM), or flash memory, or the like. In this case, the storage medium is typically included as a part of the configuration of the electronic device 100, but may also be mounted through the port of the electronic device 100 (e.g., a cloud, a server, or another electronic device) located outside the electronic device 100. The program may also be divided into a plurality of storage media, and at least a portion of the medium may be located in the external device of the electronic device 100.

Although exemplary embodiments have been shown and described, it will be appreciated by those skilled in the art that changes may be made to these exemplary embodiments without departing from the principles and spirit of the disclosure. Accordingly, the scope of the disclosure is not construed as being limited to the described exemplary embodiments, but is defined by the appended claims as well as equivalents thereto.

What is claimed is:

1. An electronic device comprising:
    a plurality of microphones;
    a communicator; and
    a processor configured to:
        identify a noise environment around the electronic device based on at least one from among amplitude information of an audio signal output by an external device and received by the plurality of microphones and state information of the external device received through the communicator, the audio signal comprising a voice signal; and
        perform a function corresponding to the voice signal based on the identified noise environment,
    wherein the processor is further configured to:
    based on an amplitude of the audio signal that is output by the external device being greater than or equal to a predetermined value corresponding to the state information, identify the noise environment around the electronic device as a first state, and based on the amplitude of the audio signal that is output by the external device being less than the predetermined value or the external device not being connected, identify the noise environment around the electronic device as a second state.

2. The electronic device of claim 1, further comprising:
a memory,
wherein the processor is further configured to:
store initialized state information of the external device at a time when the external device is initially connected in the memory, and
based on the external device being connected to the electronic device, update and identify the noise environment around the electronic device on a basis of pre-stored state information.

3. The electronic device of claim 1, wherein the processor is further configured to:
detect a voice signal section composed of a plurality of successive frames based on the received state information of the external device from the audio signal and a noise environment around the electronic device, identify, from the detected voice section, an input direction of the audio signal based on the received state information of the external device and the noise environment around the electronic device, perform beamforming based on the received state information of the external device and the noise environment around the electronic device from the input direction information of the audio signal, and process the voice signal.

4. The electronic device of claim 3, wherein the processor is further configured to:
in the first state, set a length of hang-over which identifies subsequent frames after the detected voice section as a voice to a first length, and in the second state, set the length of hang-over as a second length which is longer than the first length, and detect the voice section.

5. The electronic device of claim 3, wherein the processor is further configured to
detect the voice section by, in the first state, applying a first high weighted value to a frame which is identified as a section that is not considered the voice section from the audio signal, and in the second state, applying a second high weighted value to a frame which is identified as the voice section from the audio signal.

6. The electronic device of claim 3, wherein the processor is further configured to
identify an input direction of the audio signal by setting, in the first state, an input angle search range in a direction in which the audio signal is inputtable to a first range that is a left direction and a right direction generated in a previous frame of the detected voice section, and setting, in the second state, the input angle search range in a direction in which the audio signal is inputtable to a second range that is a left direction and a right direction generated in a previous frame of the detected voice section, the second range being wider than the first range.

7. The electronic device of claim 3, wherein the processor is further configured to:
in the first state, fix a target direction to estimate the input direction of the audio signal, wherein an audio signal of a frame that is received after the detected voice section is amplified with respect to the fixed target direction, and in the second state, set the target direction to estimate the input direction of the audio signal to all directions and identify the input direction of the audio signal in all input angle ranges.

8. A method for processing a voice signal by an electronic device comprising a plurality of microphones, the method comprising:
identifying a noise environment around the electronic device based on at least one from among amplitude information of an audio signal output by an external device and received by the plurality of microphones and state information of the external device received from the external device, the audio signal comprising a voice signal; and
performing a function corresponding to the voice signal based on the identified noise environment,
wherein the identifying the noise environment further comprises:
based on an amplitude of the audio signal that is output by the external device being greater than or equal to a predetermined value corresponding to the state information, identifying the noise environment around the electronic device as a first state, and
based on the amplitude of the audio signal that is output by the external device being less than the predetermined value or the external device not being connected, identifying the noise environment around the electronic device as a second state.

9. The method of claim 8, wherein the receiving the state information further comprises:
storing initialized state information of an external device at a time when the external device is initially connected in the memory; and
based on the external device being connected to the electronic device, updating and identifying the noise environment around the electronic device on a basis of pre-stored state information.

10. The method of claim 8, wherein the processing the voice signal further comprises:
detecting a voice signal section composed of a plurality of successive frames based on the received state information of the external device from the audio signal and the noise environment around the electronic device; identifying, from the detected voice section, an input direction of the audio signal based on the received state information of the external device and the noise environment around the electronic device; and
perform beamforming based on the received state information of the external device and the noise environment around the electronic device from the input direction information of the audio signal, and processing the voice signal.

11. The method of claim 10, wherein the detecting the voice section comprises, in the mode state, setting a length of hang-over which identifies subsequent frames after the detected voice section as a voice to a first length, and in the second state, setting the length of hang-over as a second length which is longer than the first length, and detecting the voice section.

12. The method of claim 10, wherein the detecting the voice section comprises
detecting voice section by, in the first state, applying a first high weighted value to a frame which is identified as a section that is not considered the voice section from the audio signal, and in the second state, applying a second high weighted value to a frame which is identified as the voice section from the audio signal.

* * * * *